United States Patent
Macfarlane et al.

(10) Patent No.: US 11,933,180 B2
(45) Date of Patent: Mar. 19, 2024

(54) LABYRINTH SEAL

(71) Applicant: PRATT & WHITNEY CANADA CORP., Longueuil (CA)

(72) Inventors: Ian Macfarlane, St-Bruno-de-Montarville (CA); Eric Durocher, Boucherville (CA); Guy Lefebvre, St-Bruno-de-Montarville (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/644,630

(22) Filed: Dec. 16, 2021

(65) Prior Publication Data

US 2023/0193774 A1 Jun. 22, 2023

(51) Int. Cl.
*F01D 11/02* (2006.01)
*F02C 7/28* (2006.01)

(52) U.S. Cl.
CPC ............... *F01D 11/02* (2013.01); *F02C 7/28* (2013.01); *F05D 2220/323* (2013.01); *F05D 2240/55* (2013.01)

(58) Field of Classification Search
CPC ........ F01D 11/00; F01D 11/001; F01D 11/02; F01D 11/025; F02C 7/28; F16J 15/441; F16J 15/442; F16J 15/447; F16J 15/4472; F05D 220/323; F05D 2240/55
See application file for complete search history.

(56) References Cited

U.S. PATENT DOCUMENTS

| | | | | |
|---|---|---|---|---|
| 3,490,774 A | * | 1/1970 | Henry | .................... F16J 15/441 |
| | | | | 277/543 |
| 3,743,303 A | * | 7/1973 | Pope | ....................... F01D 11/02 |
| | | | | 277/928 |
| 5,403,019 A | * | 4/1995 | Marshall | ............... F04D 29/122 |
| | | | | 277/413 |
| 5,971,400 A | | 10/1999 | Turnquist et al. | |

(Continued)

FOREIGN PATENT DOCUMENTS

CA  2 513 053 A1  2/2006
EP  3739243 A1  11/2020

OTHER PUBLICATIONS

European Search Report issued in counterpart application 22214335.6 dated May 4, 2023.

*Primary Examiner* — Elton K Wong
(74) *Attorney, Agent, or Firm* — NORTON ROSE FULBRIGHT CANADA LLP.

(57) ABSTRACT

A labyrinth seal assembly comprising: an outer seal having a radially inner cavity surface, and an axial cavity surface inward of the radially inner cavity surface; a floating seal received by the outer seal so as to be movable in a radial direction relative to the outer seal, the floating seal having a radially outer seal surface spaced inwardly from the radially inner cavity surface, a radially inner surface inward of the radially outer seal surface, and an axial seal surface bearing against the axial cavity surface; and an inner seal received by the floating seal, the inner seal having a radially outer surface spaced inwardly from the radially inner surface, a first one of the radially outer surface and the radially inner surface defining one tooth projecting toward a second one of the radially outer surface and the radially inner surface to inward of the axial seal surface.

16 Claims, 4 Drawing Sheets

(56) References Cited

U.S. PATENT DOCUMENTS

| | | | |
|---|---|---|---|
| 8,794,918 B2 | 8/2014 | Ali et al. | |
| 9,109,458 B2 | 8/2015 | Alvanos et al. | |
| 9,309,975 B2 * | 4/2016 | Kostka | F01D 11/003 |
| 10,533,441 B2 | 1/2020 | Sellhorn et al. | |
| 2006/0033287 A1 * | 2/2006 | Rago | F16J 15/441 |
| | | | 277/411 |
| 2007/0248452 A1 | 10/2007 | Brisson et al. | |
| 2016/0032765 A1 * | 2/2016 | Shuaib | F16C 33/6637 |
| | | | 277/348 |
| 2017/0350264 A1 * | 12/2017 | Terada | F01D 25/246 |
| 2018/0058239 A1 * | 3/2018 | Paulino | F04D 29/083 |
| 2019/0234240 A1 * | 8/2019 | Smith | F16J 15/28 |
| 2020/0088058 A1 | 3/2020 | Stein et al. | |
| 2020/0332899 A1 | 10/2020 | Amador | |
| 2020/0362716 A1 * | 11/2020 | Glahn | F01D 11/025 |

* cited by examiner

LABYRINTH SEAL

TECHNICAL FIELD

The application relates generally to seals and, more particularly, to labyrinth seals.

BACKGROUND OF THE ART

Labyrinth seals are used in engines to provide a sealing relationship between radially-interfacing components, one or both of which being rotatable. Labyrinth seals are characterized by a labyrinth feature comprising a series of tooth-like formations extending radially from one of the components toward the other. The components are sized and arranged relative to one another such that a radial clearance remains between tips of the tooth-like formations and the other component. As the engine operates, the radial clearance of its labyrinth seals may vary.

SUMMARY

In accordance with an aspect of the present technology, there is provided a labyrinth seal assembly comprising: an outer seal component having a radially inner cavity surface extending circumferentially about an axis, and an axial cavity surface located radially inward of the radially inner cavity surface relative to the axis; a floating seal component received by the outer seal component about the axis so as to be movable in a radial direction relative to the outer seal component, the floating seal component having a radially outer floating seal surface spaced radially inwardly from the radially inner cavity surface, a radially inner sealing surface radially inward of the radially outer seal surface, and an axial floating seal surface bearing against the axial cavity surface; and an inner seal component received by the floating seal component about the axis, the inner seal component having a radially outer sealing surface spaced radially inwardly from the radially inner sealing surface, a first one of the radially outer sealing surface and the radially inner sealing surface defining at least one tooth, the at least one tooth projecting radially toward a second one of the radially outer sealing surface and the radially inner sealing surface to a location radially inward of the axial seal surface.

In accordance with another aspect of the present technology, there is provided a labyrinth seal assembly comprising: a housing having a radially inner housing surface extending circumferentially about an axis at an axial location relative to the axis, and an axial housing surface located radially inward of the radially inner housing housing surface relative to the axis and facing toward the axial location; and a seal received by the housing about the axis so as to be movable in a radial direction relative to the housing, the seal having a radially outer seal surface spaced radially inwardly from the radially inner housing surface at the axial location, an axial seal surface facing away from the axial location and bearing against the axial housing surface, and a radially inner seal surface radially inward of the radially outer seal surface, the radially inner seal surface defining at least one tooth located at the axial location and projecting to a location radially inward of the axial seal surface.

In accordance with another aspect of the present technology, there is provided a gas turbine engine comprising: a bearing about an axis; a housing having a radially inner housing surface extending circumferentially about the axis at an axial location aft of the bearing relative to the axis, and an axial housing surface located axially between the bearing and the axial location and radially inward of the radially inner housing surface relative to the axis, the axial housing surface facing toward the axial location; a seal received by the housing about the axis so as to be movable in a radial direction relative to the housing, the seal having a radially outer seal surface spaced radially inwardly from the radially inner housing surface at the axial location, a radially inner seal surface radially inward of the radially outer seal surface, and an axial seal surface facing away from the axial location and bearing against the axial housing surface; and a shaft supported by the bearing and received by the seal about the axis, the shaft having a radially outer shaft surface spaced radially inwardly from the radially inner seal surface at the axial location, a first one of the radially outer shaft surface and the radially inner seal surface defining at least one tooth located at the axial location, the at least one tooth extending radially toward a second one of the outer shaft surface and the inner seal surface to inward of the axial seal surface.

DESCRIPTION OF THE DRAWINGS

Reference is now made to the accompanying figures in which.

DETAILED DESCRIPTION

Figure 1:
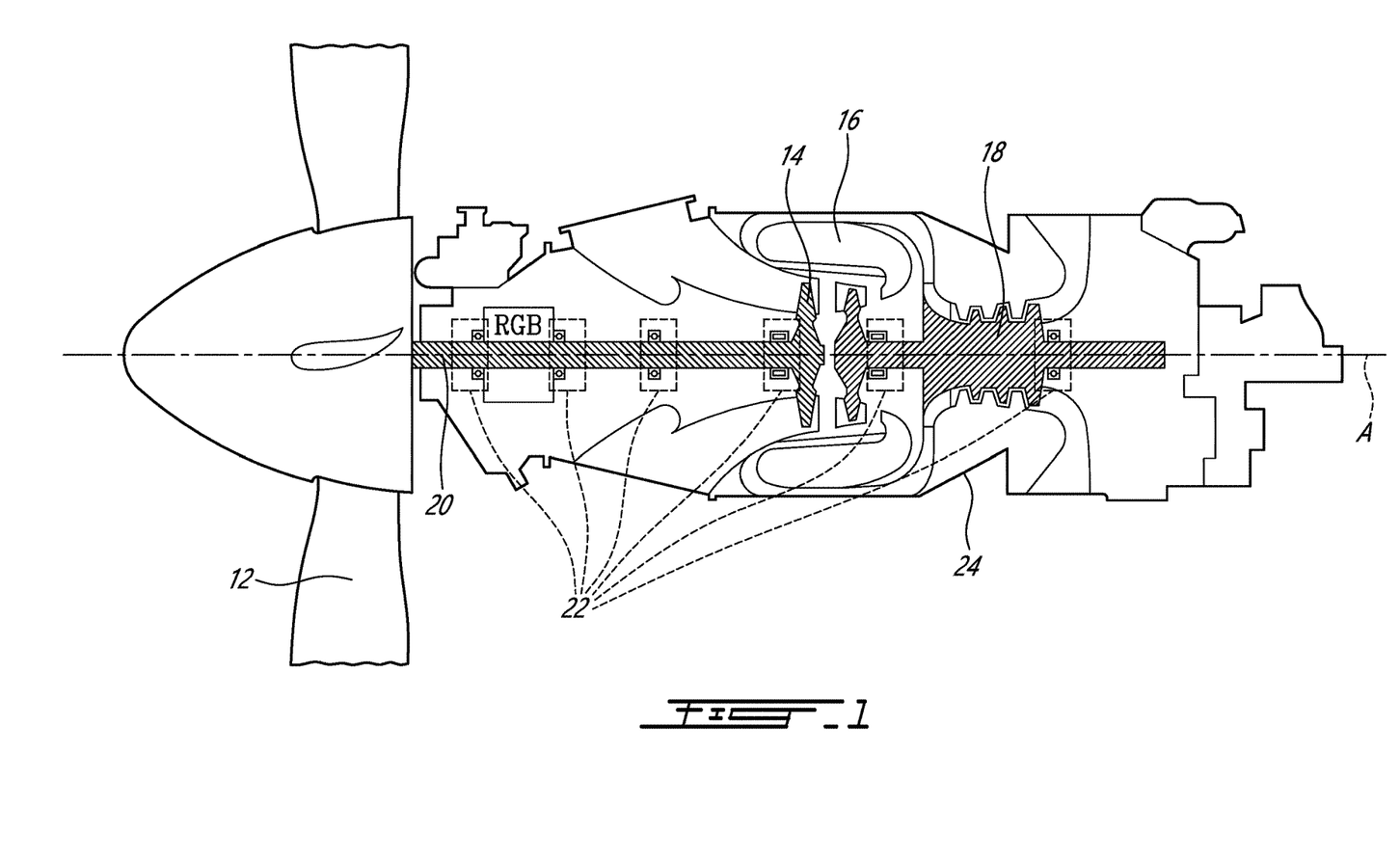
FIG. 1 is a schematic cross-sectional view of a gas turbine engine showing typical locations where labyrinth seal assemblies can be used.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. Depending on the embodiment, the engine 10 has one or more shaft(s) 20 rotatably supported by bearings 22 about an axis of the engine 10 such as axis A. The engine 10 also comprises non-rotatable structures including a casing 24 adapted to support various other structures of the engine 10 such as the bearings 22. While the engine 10 is illustrated in the form of a turbofan engine, it is understood that the engine could adopt various configurations. For instance, the engine could be provided in the form of a turboprop engine, a turboshaft engine or an auxiliary power engine to name a few. Alternatively, the engine could be provided as a hybrid electric gas turbine engine or any other types of engines including rotating components requiring sealing.

Figure 2:
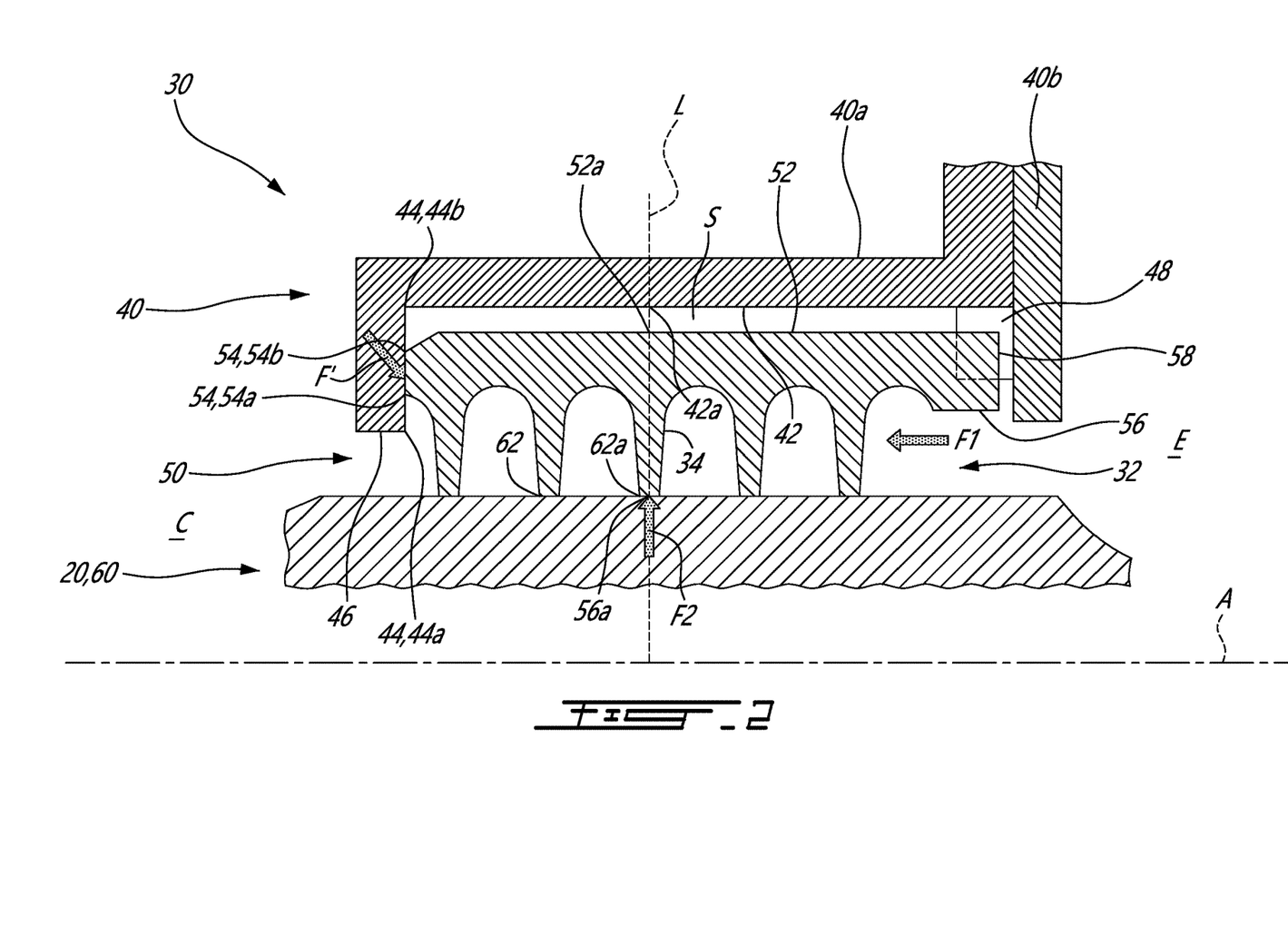
FIG. 2 is a schematic cross-sectional view of a seal assembly of the engine of FIG. 1 in accordance with an embodiment.
Figure 3:
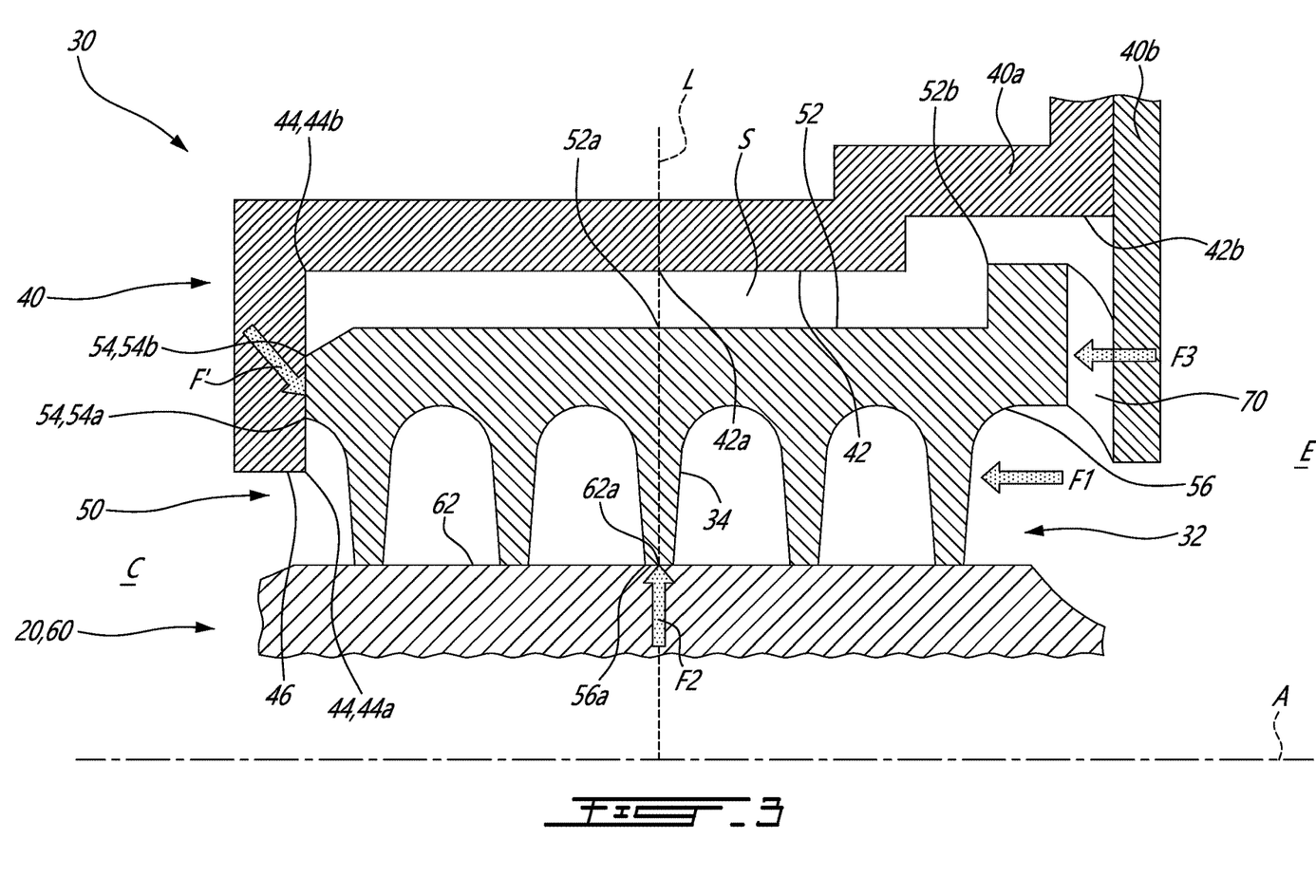
FIG. 3 is a schematic cross-sectional view of a seal assembly of the engine of FIG. 1 in accordance with another embodiment.
Figure 4:
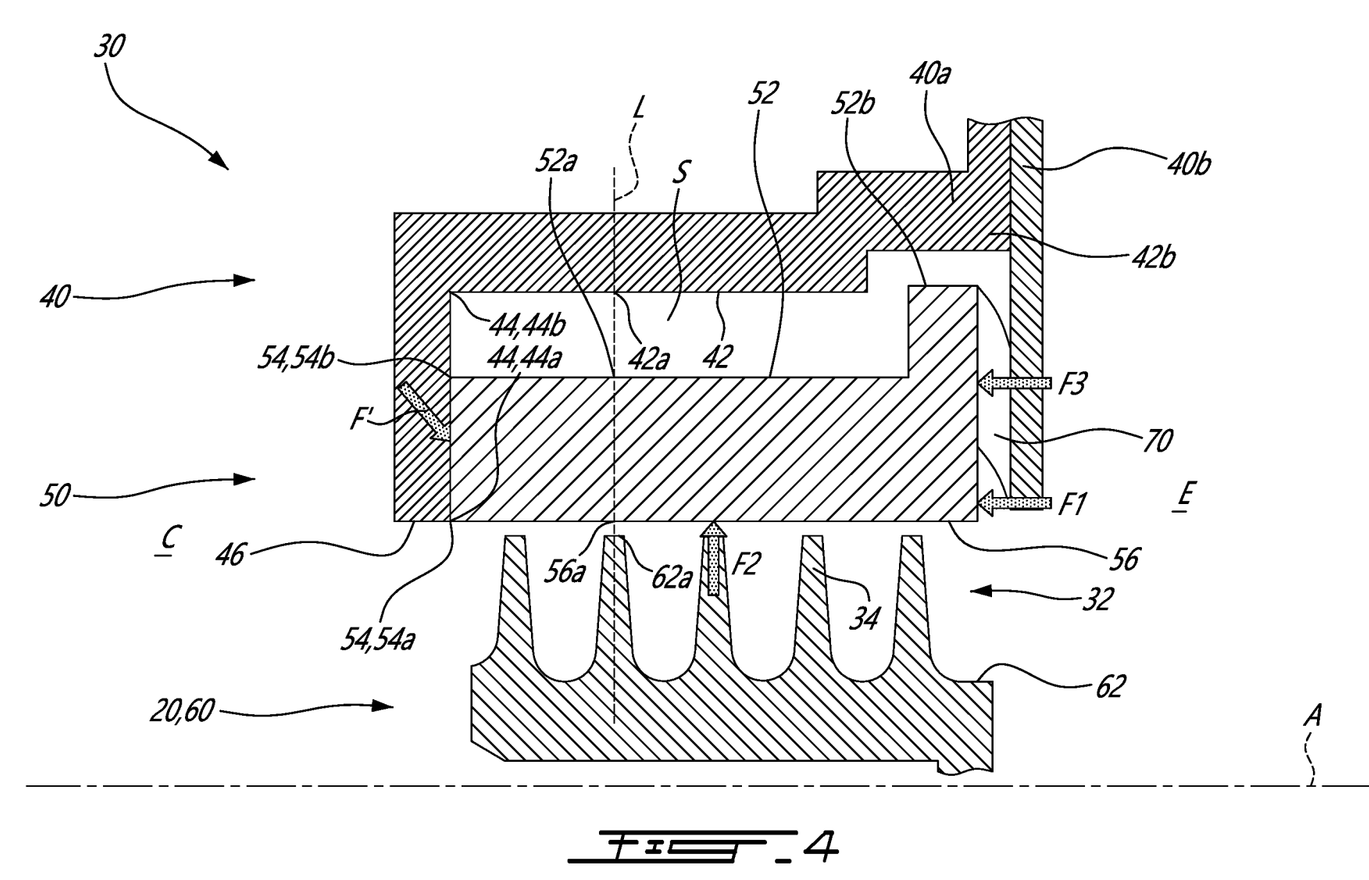
FIG. 4 is a schematic cross-sectional view of a seal assembly of the engine of FIG. 1 in accordance with another embodiment.

Generally referring to FIGS. 2-4, in some cases, the bearings 22 are contained in a bearing cavity C that may be in fluid communication with a lubrication system of the engine 10 for supplying oil to the bearing cavity C for lubricating the bearings 22. The bearing cavity C may be pressurized by way of compressed air, which may be provided by the compressor section 14, supplied via a suitable flow path into an environment E outside the bearing cavity C such that a pressure in the environment E is greater than that inside the bearing cavity C. Such a pressure difference may contribute to hindering the lubricant from leaking out from the bearing cavity C and into the environment E. To assist in hindering such leakage, a seal assembly 30 of the labyrinth type may be used in a flow path extending along the axis A between the bearing cavity C and the environment E. Although the foregoing refers to an air-to-oil application for the seal assembly 30, it shall be noted that air-to-air applications are also contemplated. For example, in some such applications, the cavity C may instead be a cavity such as the type defined by main rotor spools, by a rotor and a shaft assembled on a same spool, by a rotor (e.g., a compressor rotor, a turbine disc, etc.) and a static component (e.g., a compressor inter-stage stator, a turbine inter-stage vane inner baffle), and/or by a propeller shaft and a reduction gearbox bearing front housing.

The seal assembly 30 generally includes an outer seal component 40 about the axis A, a floating seal component 50 located about the axis A and received by the outer seal component 40, and an inner seal component 60 located about the axis A and received by the floating seal component 50. At least one of the floating seal component 50 and the inner seal component 60 defines a labyrinth feature 32, which includes at least one circumferential projection, or tooth 34, extending radially toward the other. As a result, the floating seal component 50 and the inner seal component 60 render tortuous a portion of the flow path between the bearing cavity C and the environment E. As will be described in greater detail hereinbelow, the outer seal component 40 and the floating seal component 50 are structured and arranged relative to one another so as to be radially decoupled, i.e., some radial excursion of the floating seal component 50 relative to the outer seal component 40 is possible with respect to the axis A, and to be rotationally coupled, i.e., one will not rotate about the axis A without the other. Depending on the embodiment, the outer seal component 40 and the floating seal component 50 are either rotatable or non-rotatable about the axis A. Depending on the embodiment, the inner seal component 60 is either rotatable or non-rotatable about the axis A. In some embodiments, the outer seal component 40, the floating seal component 50 and the inner seal component 60 are all rotatable about the axis A. In some such embodiments, the inner seal component 60 is rotatable about the axis A in a direction that is the opposite of that of the outer seal component 40 and the floating seal component 50. A description of embodiments of the seal assembly 30 will now be provided, in which like elements bear like numerals. For brevity, the outer seal component 40, the floating seal component 50 and the inner seal component 60 will henceforth be respectively referred to as housing 40, seal 50 and shaft 60.

Referring now more particularly to FIG. 2, the housing 40 is an annular structure 40a located on a fore side of a rotor 40b of the compressor section 14 of the engine 10. The housing 40 and the shaft 60 are rotatable about the axis A in a same direction. It shall be understood that depending on the embodiment, the housing 40 may be part of another type of component that is movable relative to the casing 24 (FIG. 1) of the engine 10, such as a gear. The housing 40 could be located in between main rotor spools, in between a compressor or turbine rotor and a shaft assembled on a same spool, in between a compressor or turbine rotor and a static component (e.g., a compressor inter-stage stator, a turbine inter-stage vane inner baffle), and/or in between a propeller shaft and a reduction gearbox bearing front housing. The housing 40 could be part of a component that is held static relative to the of the casing 24. The shaft 60, illustrated in FIG. 2 as a portion of the shaft 20, may instead be a component secured to the shaft 20 such as a disc hub or an extender. The shaft 60 may otherwise be a component that is uncoupled from the shaft 20, and may in some cases be held static relative to the casing 24. The shaft 60 could be a transmission shaft, a rotor (an impeller, a compressor axial rotor, a turbine disc, a turbine cover plate or a seal runner. The shaft 60 could be a rotating part (a shaft or a rotor) or a static part (a compressor stator inter-stage seal housing, a turbine inter-stage vane inner baffle, or a reduction gearbox front housing).

At an axial location L relative to the axis A, the housing 40 defines a seal cavity S sized for receiving at least a radially outer portion of the seal 50. The housing 40 has an annular, radially inner housing surface 42, or radially inner cavity surface, which forms a radial boundary of the seal cavity S. The radially inner housing surface 42 extends circumferentially about the axis A. At the axial location L, the radially inner housing surface 42 defines an interior housing diameter 42a. Between the bearing cavity B and the axial location L, in this case fore of the axial location L, the housing 40 has an axial housing surface 44, or axial cavity surface, that faces toward the axial location L and forms an axial boundary of the seal cavity S. The axial housing surface 44 is located radially inward of the inner housing surface 42 relative to the axis A, and extends radially between a first housing diameter 44a, or first cavity diameter, to a second housing diameter 44b, or second cavity diameter, greater than the first housing diameter 44a. In this embodiment, the radially inner housing surface 42 has a cylindrical shape extending along the axis A, although other shapes are contemplated. The axial housing surface 44 extends radially outwardly from an inner housing surface 46 of the housing 40 to the radially inner housing surface 42. Thus, the first housing diameter 44a corresponds to a diameter of the inner housing surface 46 and the second housing diameter 44b corresponds to a diameter of the radially inner housing surface 42, in this case corresponding to the interior housing diameter 42a. In other embodiments, the axial housing surface 44 may be sized so as to be radially spaced from either one or both of the radially inner housing surface 42 and the inner housing surface 46. Between the axial location L and the environment E, in this case aft of the axial location L, the housing 40 defines a first anti-rotational feature 48 cooperable with a complementary feature of the seal 50 so as to rotationally couple the housing 40 to the seal 50 upon the seal 50 being received by the seal cavity S. The first anti-rotational feature 48 is in this case a slot-like keyway that communicates with an aft side of the seal cavity S and extends radially outwardly relative to the axis A into the annular structure 40a.

Still referring to FIG. 2, the seal 50 is shown received by the seal cavity S. The seal 50 has a radially outer seal surface 52, or radially outer floating seal surface, located inside the seal cavity S yet spaced radially inwardly from the radially inner housing surface 42. For instance, at the axial location L, the radially outer seal surface 52 defines an outer seal diameter 52a that is smaller than the interior housing diameter 42a. In some embodiments, the radially outer seal surface 52 defines a radially outermost diameter of the seal 50 at the axial location L. On a side of the seal 50 facing toward the bearing cavity C, in this case a fore side of the seal 50, the seal 50 has an axial seal surface 54, or axial floating seal surface, that faces away from the axial location L and that bears against the axial housing surface 44. The axial seal surface 54 is located radially inward of the radially outer seal surface 52 relative to the axis A, and extends radially from a first seal diameter 54a, or first floating seal diameter, to a second seal diameter 54b, or second floating seal diameter, that is greater than the first seal diameter 54a. The second seal diameter 54b is also greater than the first housing diameter 44a of the axial housing surface 44, yet is smaller than the second housing diameter 44b. Hence, the axial seal surface 54 radially overlaps a radially inner portion of the axial housing surface 44. In this embodiment, the radially outer seal surface 52 has a portion having a cylindrical shape extending along the axis A, as well as a sloped portion that narrows down from the outer seal diameter 52a to the second seal diameter 54b as the radially outer seal surface 52 extends toward the axial seal surface 54. Other shapes are contemplated. Also, the first seal diameter 54a is greater than the first housing diameter 44a of the axial housing surface 44. In other embodiments, the first seal diameter 54a may instead be smaller than or equal to the first housing diameter 44a. The seal 50 also has a radially inner seal surface 56, or radially inner sealing surface, which, at the axial location L, defines an inner seal diameter 56a smaller than the outer seal diameter 52a. In this embodiment, the radially inner seal surface 56 defines the labyrinth feature 32, whose axially spaced-apart teeth 34 extend toward the shaft 60. It can also be seen that the teeth 34 of the labyrinth feature 32 extend radially to a location inward of the axial seal surface 54. Stated otherwise, tips of the teeth 34 are located radially inward of the axial seal surface 54 relative to the axis A. The teeth 34 each have a base and extend radially from their base to their tip. In this embodiment, the base of the teeth 34 is located radially outward of the first seal diameter 54a, i.e., the axial seal surface 54 extends from radially inward of the base to radially outward of the base. It should be noted that a radial position of the axial seal surface 54 relative to a height of the teeth 34 (i.e., a radial distance between the base and the tip of the teeth 34) can be configured, depending on the embodiment, based on certain design intents. Such intents may include the obtention of a specific axial load borne by the axial seal surface 54, which may be achieved by providing suitable geometry to the wetted surfaces on either side of the seal 50 (e.g., the height of the tooth 34 facing the upstream cavity, i.e., the bearing cavity C, and a size of an axial surface of the seal 50 located radially inward of the axial seal surface 54 and facing the downstream cavity, i.e., the environment E). Such intents may also include the obtention of an axial overlap between the axial seal surface 54 and the axial housing surface 44 that is suitable for axial contact for all typical engine operating conditions, which may be achieved by suitable sizing of the first housing diameter 44a and the first seal diameter 54a, taking into account that a radial position of the seal 50 may change due to thermal growth and/or rotor deflection caused by aircraft manoeuvres. Also, each of the teeth 34 defines at its tip a diameter corresponding to the inner seal diameter 56a, for instance the tooth 34 located at the axial location L. Nevertheless, embodiments are contemplated in which one or more of the teeth 34 define a diameter being smaller or greater than the inner seal diameter 56a. Here, a tip of the tooth 34 located at the axial location L defines a radially innermost diameter of the seal 50. It shall also be noted that in this embodiment, the radially outermost diameter of the seal 50 surrounds the radially innermost diameter of the seal 50.

On a side of the seal 50 facing toward the environment E, in this case an aft side of the seal 50, the seal 50 defines a second anti-rotational feature 58 cooperable with the first anti-rotational feature 48 of the housing 40 so as to rotationally couple the seal 50 to the housing 40 upon the seal 50 being received by the seal cavity S. The second anti-rotational feature 58 is in this case a key-like structure having a circumferential dimension closely matching that of the first anti-rotational feature 48, providing a secure rotational coupling of the features 48, 58. However, a diameter defined by an outermost surface of the second anti-rotational feature 58 is smaller than a diameter defined by a bottom of the first anti-rotational feature 48, providing a loose radial fit between the first anti-rotational feature 48 relative to the second anti-rotational feature 58. It is contemplated that the first and second anti-rotational features 48, 58 may be structured otherwise, so long as the secure rotational coupling and the loose radial fit are present. It should be noted that the axial seal surface 54 radially overlapping the radially inner portion of the axial housing surface 44, the spacing of the radially outer seal surface 52 relative to the radially inner housing surface 42 and the loose radial fit between the first and second anti-rotational features 48, 58 impart a range of radial movement of the seal 50 relative to the housing 40. Stated otherwise, the seal 50 is movable in the radial direction relative to the housing 40 unhindered by the first anti-rotational feature 48.

Still referring to FIG. 2, the shaft 60 is shown received by the seal 50 radially inward of the radially inner seal surface 56. The shaft 60 has a radially outer shaft surface 62, or radially outer sealing surface, spaced radially inwardly from the radially inner seal surface 56. For instance, at the axial location L, the radially outer shaft surface 62 defines an outer shaft diameter 62a that is smaller than the inner seal diameter 56a. In this embodiment, a portion of the shaft 60 surrounded by the radially inner seal surface 56 is cylindrical in shape, such that a same radial clearance is provided between each of the teeth 34 and the radially outer shaft surface 62. It is contemplated that in other embodiments, the radially outer shaft surface 62 and/or the teeth may be shaped otherwise such that at least two teeth 34 are provided with different radial clearances relative to the radially outer shaft surface 62.

Upon the seal 50 being received by the housing 40 and the shaft 60 being received by the seal 50, each of the housing 40, the seal 50 and the shaft 60 may be centered with respect to the axis A. In this position of the seal assembly 30, a first radial gap, or clearance, extending an axial length of the seal 50 surrounds the shaft 60 and is circumscribed by the seal 50. At the axial location L, the first radial gap corresponds to a first difference between the inner seal diameter 56a and the outer shaft diameter 62a. A second radial gap, or clearance, extending the axial length of the seal 50 surrounds the seal 50 and is circumscribed by the housing 40. At the axial location L, the second radial gap corresponds to a second distance between the interior housing diameter 42a and the outer seal diameter 52a. At any axial location along the axial length of the seal 50, a radial dimension of the first radial gap is smaller than a radial dimension of the second radial gap. For instance, at the axial location L, the first difference is less than the second difference.

During the operation of the engine 10, radial movement of the radially outer shaft surface 62 may occur, due for example to vibration, deflection and/or thermal growth of the shaft 60. Under certain circumstances, for example upon the radially outer shaft surface 62 moving radially outward up to the inner seal diameter 56a so as to close the first radial gap at the axial location L, contact between the shaft 60 and the seal 50 occurs. Upon the radially outer shaft surface 62 moving further radially outward, the seal 50 is free to move radially outward with the shaft 60 so as to close the second radial gap. Upon the radially outer shaft surface 62 returning radially inward so as to reestablish the first radial gap, the seal 50 tends to move radially inward so as to reestablish the second radial gap. Hence, the seal 50 may be said to float radially with the shaft 60, that is, to follow the shaft 60 radially within the boundaries of the range of radial movement of the seal 50 relative to the housing 40. In some applications, it is desirable to minimize the seal clearance, i.e., the size of the first radial gap, so as to minimize leakage across the seal assembly 30. In presence of a first radial gap of a size smaller than the radial amplitude of the vibration, deflection and/or thermal growth of the shaft 60, the seal 50 having the ability to float radially with the shaft 60 mitigates wear-inducing interactions between the shaft 60 and the seal 50.

The seal 50 may be said to be axially loaded. As a pressure differential occurs across the seal 50 due to the pressure in the environment E aft of the seal 50 being greater than the pressure in the bearing cavity C fore of the seal 50, a load (schematically shown at F1) having an axial component oriented away from the environment E and toward the cavity C is exerted onto the seal 50. Also, the seal 50 may be said to be radially loaded. Upon the shaft 60 entering radial contact with the seal 50, a load (schematically shown at F2) having a radial component directed radially outward relative to the axis A is exerted onto the seal 50. A resultant force (i.e., a force corresponding to the combination of the axial and radial loads) borne by the radially inner seal surface 56 is thus directed at an angle relative to the axis A, axially forward and radially outward. The axial seal surface 54 bears a reaction force (schematically shown at F') exerted by the axial housing surface 44 in reaction to the axial and radial loads F1, F2. The axially forward and radially outward location of the axial seal surface 54 relative to the radially inner seal surface 56 provides for a balancing of the loads borne by the seal 50. Depending on the embodiment, the radial location of the axial seal surface 54, a radial dimension of the axial seal surface 54 and a radial dimension, or height, of an upstream one of the teeth 34 can be adjusted otherwise to balance the loads borne by the seal 50.

In FIG. 3, there is shown an embodiment of the seal assembly 30 further comprising a biasing element 70 adjacent to the seal 50. The biasing element 70 is operatively connected between the housing 40 and the seal 50 to axially load the seal 50 forwardly (as schematically shown at F3), such that the axial seal surface 54 is loaded against the axial housing surface 44. This may assist in maintaining the seal 50 in a suitable position and to reduce vibration of the seal 50 in absence of a sufficient pressure gradient, which may occur for example during engine startup. It should be noted that the biasing element 70 does not hinder the radial movement of the seal 50 relative to the housing 40. In some embodiments, at least one end of the biasing element 70 is free to slide relative to the adjacent structure. For example, in some such embodiments, an aft end of the biasing element 70 is fixedly attached to the housing 40, whereas a fore end of the biasing element 70 is free to slide relative to the seal 50 as the seal 50 moves radially. The biasing element 70 shown is of the wave spring type, although other types of biasing elements are contemplated. It is contemplated that in some embodiments, the biasing element 70 may form part of the first anti-rotational feature 48. FIG. 3 also depicts other shapes contemplated for the radially inner housing surface 42 and the radially outer seal surface 52. Namely, an aft portion of the radially outer seal surface 52 defines an aft outer seal diameter 52*b* that is greater than the outer seal diameter 52*a*. Likewise, an aft portion of the radially inner housing surface 42 defines an aft interior housing diameter 42*b* that is greater than the interior housing diameter 42*a*. In this embodiment, a difference between the aft interior housing diameter 42*b* and the aft outer seal diameter 52*b* corresponds to the first difference, whereas in other embodiments, the difference may be smaller (FIG. 4) or greater than the first difference.

Referring now to FIG. 4, there is shown an embodiment of the seal assembly 30 in which the labyrinth feature 32 is defined by the outer surface 62 of the shaft 60. In some such embodiments, the first seal diameter 54*a* may correspond to a diameter defined by the inner seal surface 46. The second seal diameter 54*b* may correspond to the outer seal diameter 52*a*. The seal assembly 30 may be provided with the biasing element 70.

Depending on the embodiment, the housing 40, the seal 50 and the shaft 60 may be constructed of materials having different coefficients of thermal expansion. Such materials may be selected to be combined so that suitable clearances and a suitable range of radial movement of the seal 50 are provided at temperatures typical of normal engine operating conditions. Such materials may include titanium, steel, nickel alloys, aluminum, magnesium, etc., and suitable combinations may include titanium and aluminum, titanium and magnesium, aluminum and magnesium, steel and aluminum, steel and magnesium, titanium and nickel alloys, nickel alloys and steel, etc.

Depending on the embodiment, the housing 40, the seal 50 and the shaft 60 may be constructed of materials having different hardnesses and/or abradability. For instance, in some embodiments in which the radially inner seal surface 56 defines the labyrinth feature 32, a coating of material harder than that of the radially inner seal surface 56 is applied to the radially outer shaft surface 62. Conversely, in some embodiments in which the radially outer shaft surface 62 defines the labyrinth feature 32 (e.g., FIG. 4), a coating of material harder than that of the radially outer shaft surface 62 is applied to the radially inner seal surface 56. Alternatively, in some embodiments in which the radially outer shaft surface 62 defines the labyrinth feature 32, at least the radially inner seal surface 56 of the seal 50 is constructed of a material that is more abradable than that of the radially outer shaft surface 62.

It shall be noted that among other advantages, at least some embodiments of the seal assembly provides improvements to engine performance (for example with regard to specific fuel consumption, oil consumption) by allowing to reduce seal clearance, i.e., the size of the first radial gap between the inner seal component 60 and the outer seal component 50, compared to known conventional seal assemblies. Moreover, the seal assembly 30 is easily retrofittable in existing engines, whether in full or in part. For instance, when compared with conventional seal types such as carbon seals, brush seals, piston rings and the like, the seal assembly 30 may be said to be more compact as it has a relatively smaller envelope in the radial direction, and is thus better suited for retrofitting applications in which space is limited. In some cases, an existing seal assembly may have an existing seal component sized for a snug fit with an existing outer seal component, or housing, thereof and for a first seal clearance with respect to an existing inner seal component thereof. The existing seal component can be replaced by a floating seal component 50 as described hereinabove that is sized with respect to the existing inner seal component to provide a second seal clearance smaller than the first seal clearance, and with respect to the existing outer seal component to provide the ability of the floating seal component 50 to move radially relative to the existing outer seal component.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, some of the components described and/or depicted as integral pieces may instead comprise several portions, layers or the like, some of which may be constructed of different materials and/or exhibit different structural characteristics. Yet further modifications could be implemented by a person of ordinary skill in the art in view of the present disclosure, which modifications would be within the scope of the present technology.

The invention claimed is:

1. A labyrinth seal assembly comprising:
   an outer seal component having a radially inner cavity surface extending circumferentially about an axis, and an axial cavity surface located radially inward of the radially inner cavity surface relative to the axis, the axial cavity surface extending radially outwardly from an inner cavity diameter to an outer cavity diameter;
   a floating seal component received by the outer seal component about the axis so as to be movable in a radial direction relative to the outer seal component, the floating seal component structurally radially decoupled from the outer seal component, the floating seal component extending axially from a first end to a second end, the floating seal component having a radially outer floating seal surface extending from the first end to the second end, the radially outer floating seal surface spaced radially inwardly from the radially inner cavity surface, a radially inner sealing surface radially inward of the radially outer floating seal surface, an axial floating seal surface at the first end of the floating seal component, the axial floating seal surface bearing against the axial cavity surface, the axial floating seal surface movable relative to the axial cavity surface, the axial floating seal surface extending radially outwardly from an inner floating seal diameter to an outer floating seal diameter, a slope portion at the first axial end between the outer floating seal diameter and the radially outer floating seal surface, and a recess portion in the first axial end between the inner floating seal diameter and the radially inner sealing surface, the inner floating seal diameter spaced radially outwardly from the inner cavity diameter of the axial cavity surface of the outer seal component; and
   an inner seal component received by the floating seal component about the axis, the inner seal component having a radially outer sealing surface spaced radially inwardly from the radially inner sealing surface,
   the radially inner sealing surface defining at least one tooth, the at least one tooth projecting radially toward the radially outer sealing surface to a location radially inward of the axial floating seal surface;
   wherein in a first position where the outer seal component, the floating seal component and the inner seal component are centered with respect to the axis, a first radial gap extends from the radially outer sealing surface of the inner seal component to the radially inner sealing surface of the floating seal component, and a second radial gap extends from the radially inner cavity surface of the outer seal component to the radially outer floating seal surface of the floating seal component, and wherein the first radial gap is smaller than the second radial gap.

2. The labyrinth seal assembly of claim 1, wherein a tip of the at least one tooth defines a radially innermost diameter of the floating seal component.

3. The labyrinth seal assembly of claim 2, wherein in the first position, the outer cavity diameter of the axial cavity surface of the outer seal component is greater than the outer floating seal diameter of the axial floating seal surface of the floating seal component.

4. The labyrinth seal assembly of claim 1, wherein the outer seal component and the floating seal component respectively define a first anti-rotational feature and a second anti-rotational feature cooperable so as to hinder rotation of the outer seal component and the floating seal component relative to one another about the axis, the floating seal component movable in the radial direction relative to the outer seal component unhindered by the first anti-rotational feature.

5. The labyrinth seal assembly of claim 1, further comprising a biasing element operatively connected between the outer seal component and the floating seal component so as to axially load the axial floating seal surface against the axial cavity surface, the floating seal component movable in the radial direction relative to the outer seal component unhindered by the biasing element.

6. A gas turbine engine comprising:
   a bearing; and
   the labyrinth seal assembly according to claim 1.

7. The gas turbine engine of claim 6, wherein a tip of the at least one tooth defines a radially innermost diameter of the floating seal component.

8. The gas turbine engine of claim 7, wherein the radially outer floating seal surface defines a radially outermost diameter of the floating seal component surrounding the radially innermost diameter.

9. The gas turbine engine of claim 7, wherein the outer cavity diameter of the axial cavity surface of the outer seal component is greater than the outer floating seal diameter of the axial floating seal surface of the floating seal component.

10. The gas turbine engine of claim 7, wherein the axial floating seal surface extends from radially inward of a base of the at least one tooth to radially outward of the base.

11. The gas turbine engine of claim 6, wherein the outer seal component and the floating seal component respectively define a first anti-rotational feature and a second anti-rotational feature cooperable so as to hinder rotation of the outer seal component and of the floating seal component relative to one another about the axis, the second anti-rotational feature movable in the radial direction relative to the first anti-rotational feature as the floating seal component moves with the inner seal component relative to the outer seal component in the radial direction.

12. The gas turbine engine of claim 11, wherein the outer seal component is a part of a rotor of the gas turbine engine, the outer seal component rotatable with the floating seal component about the axis.

13. The gas turbine engine of claim 6, further comprising a biasing element operatively connected between the outer seal component and the floating seal component so as to axially load the axial floating seal surface against the axial surface, the floating seal movable with the inner seal component relative to the outer seal component in the radial direction unhindered by the biasing element.

14. The labyrinth seal assembly of claim 1, wherein the outer seal component is a housing, and the inner seal component is a shaft.

15. The labyrinth seal assembly of claim 14, wherein the housing is rotatable with the floating seal component about the axis.

16. The labyrinth seal assembly of claim 1, wherein the axial floating seal surface extends radially outwardly from radially inward of a base of the at least one tooth to radially outward of the base.

* * * * *